US011864265B2

(12) United States Patent
Sabeur et al.

(10) Patent No.: US 11,864,265 B2
(45) Date of Patent: *Jan. 2, 2024

(54) PROXY-CALL SESSION CONTROL FUNCTION (P-CSCF) RESTORATION

(71) Applicant: T-Mobile USA, Inc., Bellevue, WA (US)

(72) Inventors: Nassereddine Sabeur, Bellevue, WA (US); Saqib Badar, Bellevue, WA (US); Shujaur Mufti, Snoqualmie, WA (US); Joel Arends, Renton, WA (US); Subramania Kaushik, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 69 days.

This patent is subject to a terminal disclaimer.

(21) Appl. No.: 17/500,916

(22) Filed: Oct. 13, 2021

(65) Prior Publication Data

US 2023/0113082 A1   Apr. 13, 2023

(51) Int. Cl.
*H04L 67/56* (2022.01)
*H04W 24/04* (2009.01)
*H04W 8/04* (2009.01)

(52) U.S. Cl.
CPC .............. *H04W 8/04* (2013.01); *H04L 67/56* (2022.05); *H04W 24/04* (2013.01)

(58) Field of Classification Search
CPC ........ H04W 8/04; H04W 24/04; H04L 67/56; H04L 65/1016; H04L 65/1045; H04L 65/1069; H04L 65/1104; H04L 65/1073
See application file for complete search history.

(56) References Cited

U.S. PATENT DOCUMENTS

| 8,018,858 B2 * | 9/2011 | Lim ........................ H04L 69/40 370/242 |
| 8,442,526 B1 * | 5/2013 | Bertz ...................... H04W 8/04 455/433 |

(Continued)

FOREIGN PATENT DOCUMENTS

| WO | WO-2014053162 A1 * | 4/2014 | ......... H04L 65/1016 |
| WO | WO-2015078528 A1 * | 6/2015 | ......... H04L 65/1016 |

(Continued)

OTHER PUBLICATIONS

3GPP TS 23.228 version 16.5.0 Release 16 (Oct. 2020). (Year: 2020).*

(Continued)

*Primary Examiner* — Yuwen Pan
*Assistant Examiner* — Swati Jain
(74) *Attorney, Agent, or Firm* — Barta, Jones & Foley, PLLC

(57) ABSTRACT

Solutions for providing a data traffic session with proxy-call session control function (P-CSCF) restoration include: receiving an indication, by an application server (AS), that a user equipment (UE) registered with a first proxy node; receiving, by the AS, from a call session control function, a first indication that the first proxy node is unavailable; based on at least receiving the first indication that the first proxy node is unavailable, transmitting, by the AS, to a subscriber information node, a first message triggering proxy node restoration (e.g., over an N71 interface); receiving an indication, by the AS, that the UE is registered with a second proxy node different than the first proxy node; and based on at least receiving a session initiation message, establishing the data traffic session for the UE with the second proxy node.

20 Claims, 5 Drawing Sheets

(56) References Cited

U.S. PATENT DOCUMENTS

| | | | | |
|---|---|---|---|---|
| 8,644,823 | B2* | 2/2014 | Rozinov | H04L 61/4535 709/227 |
| 8,934,461 | B2* | 1/2015 | Leis | H04L 65/1016 370/384 |
| 9,001,664 | B2* | 4/2015 | Sparks | H04L 69/40 370/236 |
| 9,143,537 | B2* | 9/2015 | Mui | H04L 65/1104 |
| 9,288,276 | B2* | 3/2016 | Adamczyk | H04L 67/54 |
| 9,398,473 | B2* | 7/2016 | Goerke | H04W 36/0016 |
| 9,426,833 | B2* | 8/2016 | Mufti | H04L 65/1069 |
| 9,578,068 | B2* | 2/2017 | Merino Vazquez | H04L 65/1073 |
| 9,596,712 | B2* | 3/2017 | Hallenstål | H04W 76/19 |
| 9,699,050 | B2* | 7/2017 | Jin | H04L 67/56 |
| 9,894,110 | B2* | 2/2018 | Li | H04L 65/1016 |
| 9,979,756 | B2* | 5/2018 | Nomani | H04L 65/1073 |
| 10,148,487 | B2* | 12/2018 | Kunz | H04L 65/1045 |
| 10,219,149 | B2* | 2/2019 | Kim | H04W 8/28 |
| 10,284,420 | B2* | 5/2019 | Livanos | H04M 15/57 |
| 10,326,604 | B2* | 6/2019 | Castro Castro | H04L 65/1016 |
| 10,327,277 | B2* | 6/2019 | Kim | H04W 36/0022 |
| 10,523,720 | B2* | 12/2019 | Hallenstål | H04W 24/04 |
| 10,812,534 | B2* | 10/2020 | Chong | H04L 65/1069 |
| 10,856,110 | B1* | 12/2020 | Files | G01S 5/0036 |
| 10,939,345 | B2* | 3/2021 | Chong | H04W 60/00 |
| 11,178,714 | B2* | 11/2021 | Li | H04L 65/1045 |
| 11,218,519 | B2* | 1/2022 | Foti | H04L 67/1025 |
| 11,290,549 | B2* | 3/2022 | Krishan | H04L 67/51 |
| 2012/0185613 | A1 | 7/2012 | Noldus | H04L 67/141 709/248 |
| 2013/0010804 | A1* | 1/2013 | Fernandez Alonso | H04L 65/104 370/428 |
| 2015/0120947 | A1* | 4/2015 | Guo | H04L 67/142 709/228 |
| 2015/0195864 | A1* | 7/2015 | Bartolome Rodrigo | H04W 88/182 370/221 |
| 2016/0380802 | A1* | 12/2016 | Kunz | H04L 41/06 370/216 |
| 2018/0213449 | A1* | 7/2018 | Kim | H04W 24/04 |
| 2018/0241784 | A1* | 8/2018 | Hallenstål | H04L 65/1104 |
| 2019/0053117 | A1* | 2/2019 | Bae | H04W 36/125 |
| 2019/0104044 | A1* | 4/2019 | Yang | H04L 41/0604 |
| 2019/0261449 | A1* | 8/2019 | Kim | H04L 65/1046 |
| 2019/0335534 | A1* | 10/2019 | Atarius | H04L 65/1016 |
| 2020/0153874 | A1* | 5/2020 | Christopher | H04L 65/1104 |
| 2020/0178336 | A1* | 6/2020 | Li | H04L 65/1045 |
| 2020/0195495 | A1 | 6/2020 | Parker | |
| 2020/0322785 | A1 | 10/2020 | Jia | |
| 2021/0266349 | A1* | 8/2021 | Foti | H04W 68/005 |
| 2021/0377896 | A1* | 12/2021 | Wei | H04W 8/00 |
| 2022/0014948 | A1* | 1/2022 | Smith | H04L 63/1416 |
| 2022/0225448 | A1* | 7/2022 | Li | H04W 60/04 |
| 2022/0232046 | A1* | 7/2022 | Agarwal | H04L 65/1016 |
| 2022/0232051 | A1* | 7/2022 | Zhu | H04L 65/1073 |
| 2022/0247798 | A1* | 8/2022 | Guo | H04W 48/16 |
| 2022/0264283 | A1* | 8/2022 | Won | H04W 8/22 |
| 2022/0303175 | A1* | 9/2022 | Kunz | H04W 12/02 |

FOREIGN PATENT DOCUMENTS

| | | | | |
|---|---|---|---|---|
| WO | WO-2020008292 | A1* | 1/2020 | H04L 65/1006 |
| WO | WO-2020057764 | A1* | 3/2020 | H04L 65/1006 |
| WO | WO-2020228471 | A1* | 11/2020 | H04L 65/1016 |
| WO | WO-2022211686 | A1* | 10/2022 | |
| WO | 2023034671 | A1 | 3/2023 | |
| WO | 2023064701 | A1 | 4/2023 | |
| WO | 2023064716 | A1 | 4/2023 | |

OTHER PUBLICATIONS

ZTE, "Solution for P-CSCF Restoration", vol. CT WG4, No. Krakow, Poland; Aug. 21, 2017-Aug. 25, 2017, Aug. 20, 2017 (Aug. 20, 2017), 3GPP Draft; C4-174152_P-CSCF Restoration. (Year: 2017).*

Ericsson, "P-CSCF restoration in 5GS", vol. CT WG4, No. KunMing, P.R. China; Apr. 16, 2018-Apr. 20, 2018, Apr. 15, 2018 (Apr. 15, 2018), 3GPP Draft; C4-183182-DISC-P-CSCF-Restoration. (Year: 2018).*

3GPP TS 23.380 v 16.4.0, IMS Restoration Procedures Release 16, Jun. 2021 (Year: 2021).*

International Search Report and Written Opinion, by the ISA/KR, dated Nov. 14, 2022, in PCT Application No. PCT/US2022/074433 (7 pages).

International Search Report and Written Opinion, by the ISA/EP, dated Dec. 19, 2022, in PCT Application No. PCT/US2022/077725 (11 pages).

International Search Report and Written Opinion, by the ISA/EP, dated Dec. 19, 2022, in PCT Application No. PCT/US2022/077809 (8 pages).

3GPP; TSGCT; IMS Restoration Procedures; (Release 16), 3GPP TS 23.380 V16.4.0, Jun. 29, 2021 (57 pages).

Nokia et al., Correcting AMF behaviour for Service Request that is not integrity protected, S2-1903668, SA WG2 Meeting #132, Xi'an, PRC, Apr. 2, 2019 (376 pages).

Huawei et al., Support of PCRF-based P-CSCF restoration, C4-203107, 3GPP TSG-CT WG4 Meeting #98e, May 22, 2020 (4 pages).

Hewlett Packard Enterprise, Trigger P-CSCF Restoration Description and Callback URIs, C4-212525, 3GPP TSG-CT WG4 Meeting #103-e, Apr. 22, 2021 (8 pages).

Ericsson, "P-CSCF restoration in 5GS", vol. CT WG4, No. KunMing, P.R. China; Apr. 16, 2018-Apr. 20, 2018, Apr. 15, 2018 (Apr. 15, 2018), 3GPP Draft; C4-183182-DISC-P-CSCF-Restoration, 3rd Generation Partnership Project (3GPP), Mobiles Competence Centre; 650 Route Des Lucioles; F-06921 Sophia-Antipolis Cedex; France (4 pages).

ZTE, "Solution for P-CSCF Restoration", vol. CT WG4, No. Krakow, Poland; Aug. 21, 2017-Aug. 25, 2017, Aug. 20, 2017 (Aug. 20, 2017), 3GPP Draft; C4-174152_P-CSCF Restoration, 3rd Generation Partnership Project (3GPP), Mobile Competence Centre; 650 Route Des Lucioles; F-06921 Sophia-Antipolis Cedex; France (2 pages).

* cited by examiner

PROXY-CALL SESSION CONTROL FUNCTION (P-CSCF) RESTORATION

BACKGROUND

A proxy-call session control function (P-CSCF) is a session initiation protocol (SIP) proxy that is the first point of contact for a user equipment (UE) in a mobile network. Different types of IMS traffic, such as fifth generation (5G) cellular, fourth generation (4G) cellular, short message service (SMS), WiFi, in-vehicle local area network (LAN), and rich communication services (RCS), are supported by P-CSCFs. For example, in order to make a voice or video call, a UE sends a SIP message (e.g., a SIP invite) to a P-CSCF, which forwards it to the IMS, in order to reach the called party.

A UE typically updates its registration with a P-CSCF on a predetermined interval, such as hourly (for example, a registration may expire after an hour) in order to balance UE battery drain and network traffic with the possibility of a UE being out of service. UE registration with a P-CSCF is described in cellular standards 3GPP TS 23.380 and ETSI TS 123 380. However, when a P-CSCF ceases operating properly (e.g., due to being overloaded, maintenance, or some other reason) UEs that had registered with that P-CSCF may remain unaware of the service outage until their next scheduled registration update. The delay between when a P-CSCF ceases operating properly and the UE's next scheduled registration update may negatively impact a UE's connectivity-dependent functionality, such as voice or video calls, thereby degrading user experience.

SUMMARY

The following summary is provided to illustrate examples disclosed herein, but is not meant to limit all examples to any particular configuration or sequence of operations.

Solutions for providing a data traffic session with proxy-call session control function (P-CSCF) restoration include: receiving an indication, by an application server (AS), that a user equipment (UE) registered with a first proxy node; receiving, by the AS, from a call session control function, a first indication that the first proxy node is unavailable; based on at least receiving the first indication that the first proxy node is unavailable, transmitting, by the AS, to a subscriber information node, a first message triggering proxy node restoration (e.g., over an N71 interface); receiving an indication, by the AS, that the UE is registered with a second proxy node different than the first proxy node; and based on at least receiving a session initiation message, establishing the data traffic session for the UE with the second proxy node.

BRIEF DESCRIPTION OF THE DRAWINGS

The disclosed examples are described below with reference to the accompanying drawing figures listed below, wherein.

Figure 1:
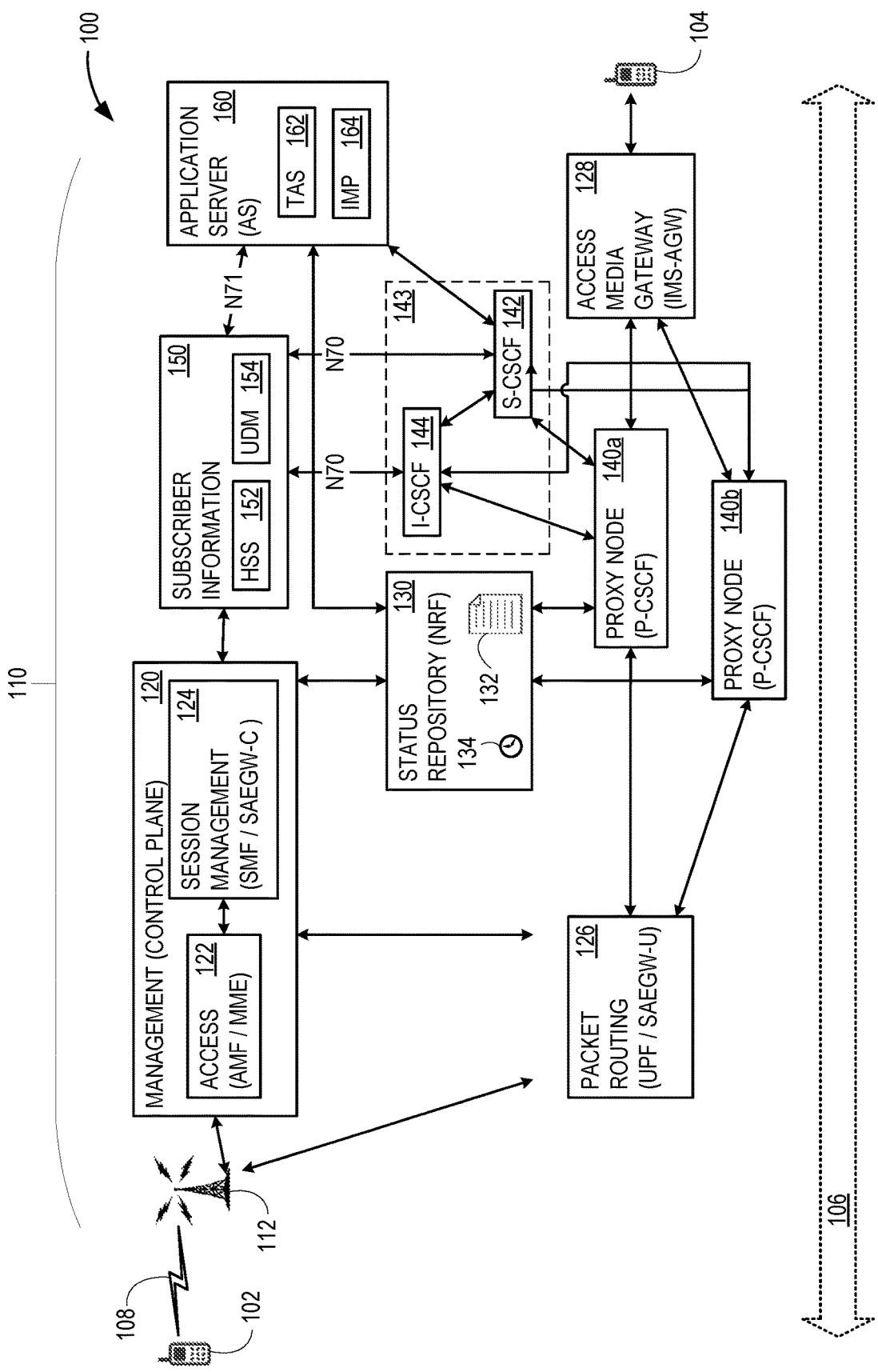
FIG. 1 illustrates an exemplary arrangement that advantageously performs proxy-call session control function (P-CSCF) restoration when providing a data traffic session.

Corresponding reference characters indicate corresponding parts throughout the drawings. References made throughout this disclosure relating to specific examples, are provided for illustrative purposes, and are not meant to limit all implementations or to be interpreted as excluding the existence of additional implementations that also incorporate the recited features.

DETAILED DESCRIPTION

Solutions for providing a data traffic session with proxy-call session control function (P-CSCF) restoration include: receiving an indication, by an application server (AS), that a user equipment (UE) registered with a first proxy node; receiving, by the AS, from a call session control function, a first indication that the first proxy node is unavailable; based on at least receiving the first indication that the first proxy node is unavailable, transmitting, by the AS, to a subscriber information node, a first message triggering proxy node restoration (e.g., over an N71 interface); receiving an indication, by the AS, that the UE is registered with a second proxy node different than the first proxy node; and based on at least receiving a session initiation message, establishing the data traffic session for the UE with the second proxy node.

Aspects of the disclosure improve the robustness, resilience, and reliability of wireless communications when transmitting, by a subscriber information node, to a management node, a message triggering proxy node restoration. The UE then locates and registers with a properly functioning proxy node. This results in the UE being registered with the properly functioning proxy node earlier than would occur if the UE instead waited until the lapse of its periodic proxy node registration. Upon re-registration, the UE is able to receive calls and other message traffic. Delays that would occur within the network used by the UE are thus mitigated.

FIG. 1 illustrates an exemplary arrangement 100 that advantageously performs P-CSCF restoration when establishing a data traffic session 106 for a UE 102 on a network 110. Data traffic session 106 may be, for example a video call or a voice call with a second UE 104, using a TAS 162, or an instant messaging (IM) session using an instant messaging platform (IMP) 164. TAS 162 and IMP 164 are examples of a general AS 160, although additional types of application servers may also be used. In some examples, UE 102 comprises an internet of things (IoT) device, such as a connected appliance, a smart home security system, an autonomous factory or farming machine, a wearable health monitor, a wireless inventory tracker, or another device, rather than merely a hand-held cellular telephone. In some examples, UE 102 sets up data traffic session 106 using session initiation protocol (SIP) signaling.

UE 102 registers with a network 110, which provides data traffic session 106. UE 102 communicates over an air interface 108 with a radio access network (RAN) 112 within network 110. Data traffic passes from RAN 112 through a packet routing node 126, a selected one of proxy nodes 140a and 140b, and an internet protocol (IP) messaging system (IMS) access gateway (IMS-AGW) 128 to reach second UE 104. Signaling for data traffic session 106 passes through a control plane portion of network 110 that includes an access node 122 and a session management node 124, which together are identified as a management node 120.

In some examples, proxy node 140a and proxy node 140b each comprises a P-CSCF. In fourth generation cellular (4G) examples, access node 122 may comprise a mobility management entity (MME), whereas in fifth generation cellular (5G) examples, access node 122 may comprise an access and mobility function (AMF). In 4G examples, session management node 124 may comprise a system architecture (SAE) evolution gateway—control plane (SAEGW-C). An SAEGW-C is the combination of a serving gateway (SGW)—control plane (SGW-C) and a packet data network gateway (PGW)—control plane (PGW-C). In 5G examples, session management node 124 may comprise a session management function (SMF). In 4G examples, packet routing node 126 may comprise an SAE evolution gateway—user plane (SAEGW-U). An SAEGW-U is the combination of an SGW—user plane (SGW-U) and a PGW—user plane (PGW-U). In 5G examples, packet routing node 126 may comprise a user plane function (UPF).

A status repository 130 may comprise a network repository function (NRF), which maintains a list 132 of registered network functions (e.g., proxy nodes 140a and 140b), their status (e.g., registered, suspended), and their subscriber information (e.g., identifying any of AS 160, TAS 162 and/or IMP 164). Status repository 130 also has a heartbeat timer 134. If status repository 130 does not receive a heartbeat message from a registered network function, such as proxy node 140a, by the lapse of timer 134, the status of that network function will change on list 132 to indicate that the non-responsive network function is unavailable (e.g., the status changes from registered to suspended). Status repository 130 is also in communication with management node 120.

A subscriber information node 150 includes a home subscriber server (HSS) 152 and, for 5G, a unified data management function (UDM) 154. Subscriber information node 150 is in communication with management node 120, and AS 160, which represents TAS 162 and/or IMP 164. Communication between subscriber information node 150 and AS 160 may use an N71 interface. Subscriber information node 150 is also in communication with proxy nodes 140a and 140b via an interrogating-CSCF (I-CSCF) 144 and a serving-CSCF (S-CSCF) 142. I-CSCF 144 and/or S-CSCF 142 are referenced herein generally as call session control function (CSCF) 143. In some examples, CSCF 143 communicates with subscriber information node 150 using an N70 interface. CSCF 143 is also in communication with AS 160. It should be understood that examples of network 110 may use different numbers of elements than shown. For example, a common core network may have six to ten pools of approximately a dozen or more P-CSCFs each.

Figure 2:
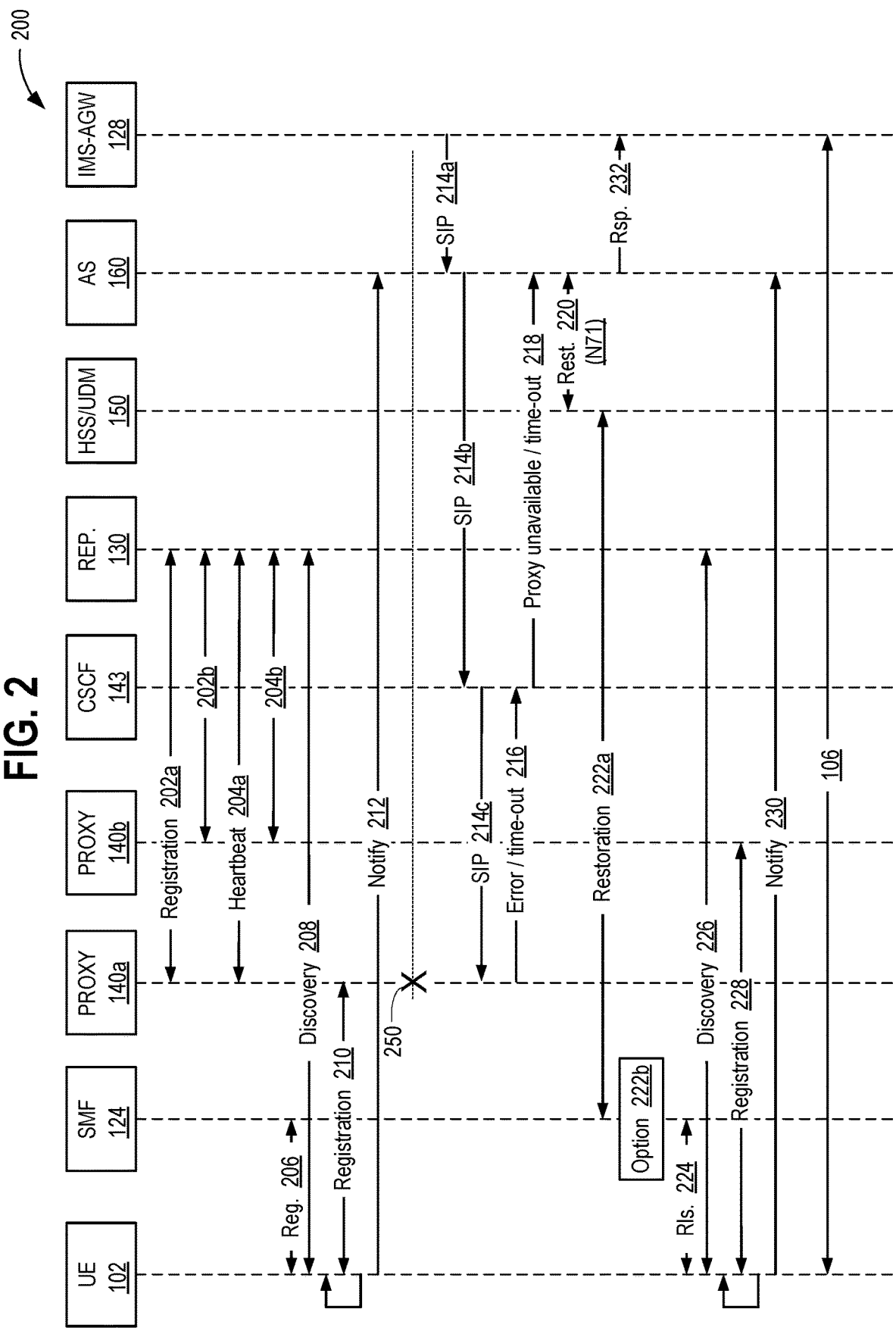
FIG. 2 illustrates an exemplary message sequence diagram associated with examples of the arrangement of FIG. 1.
Figure 3:
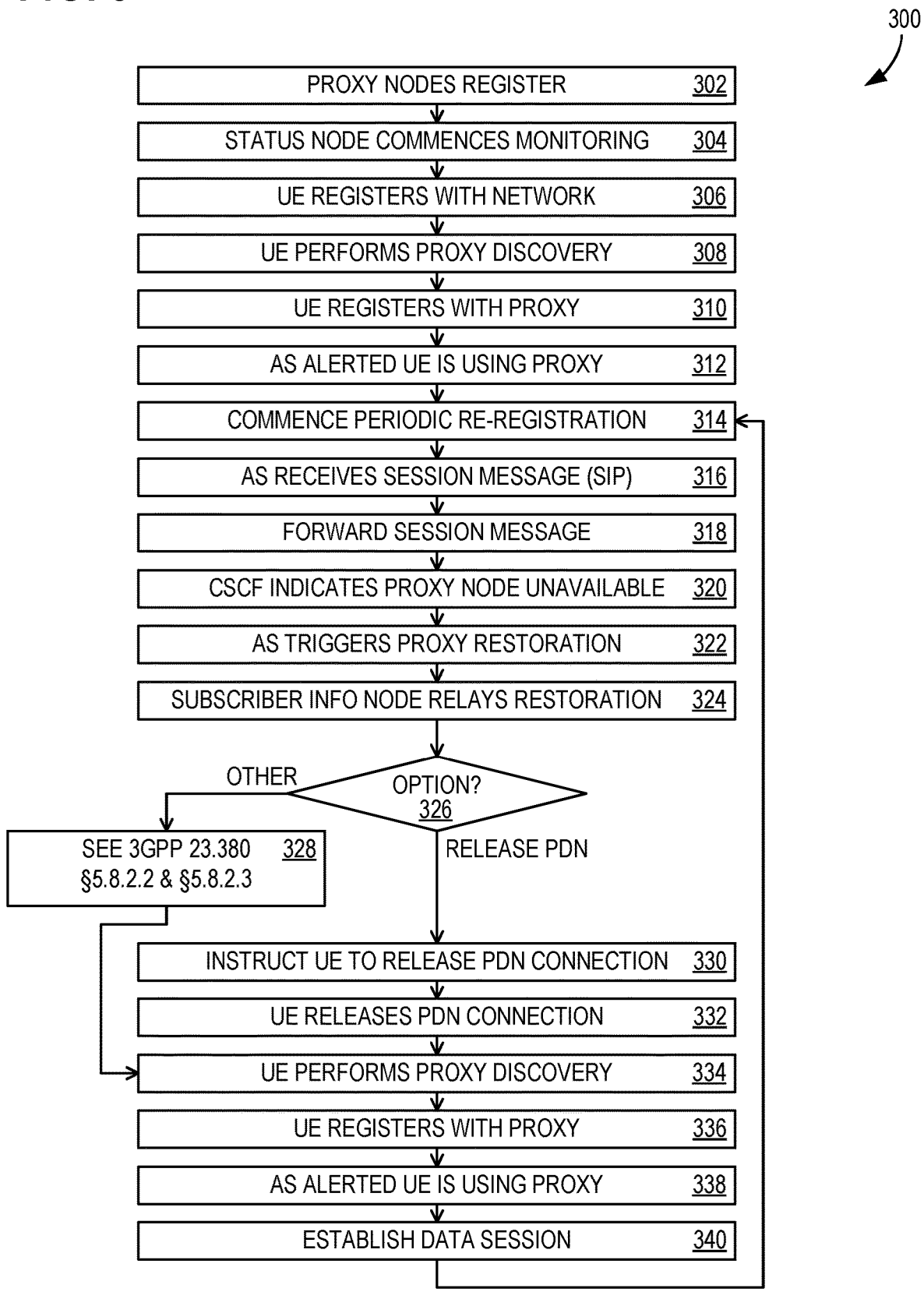
FIG. 3 illustrates a flowchart of exemplary operations associated with examples of the arrangement of FIG. 1.
Figure 4:
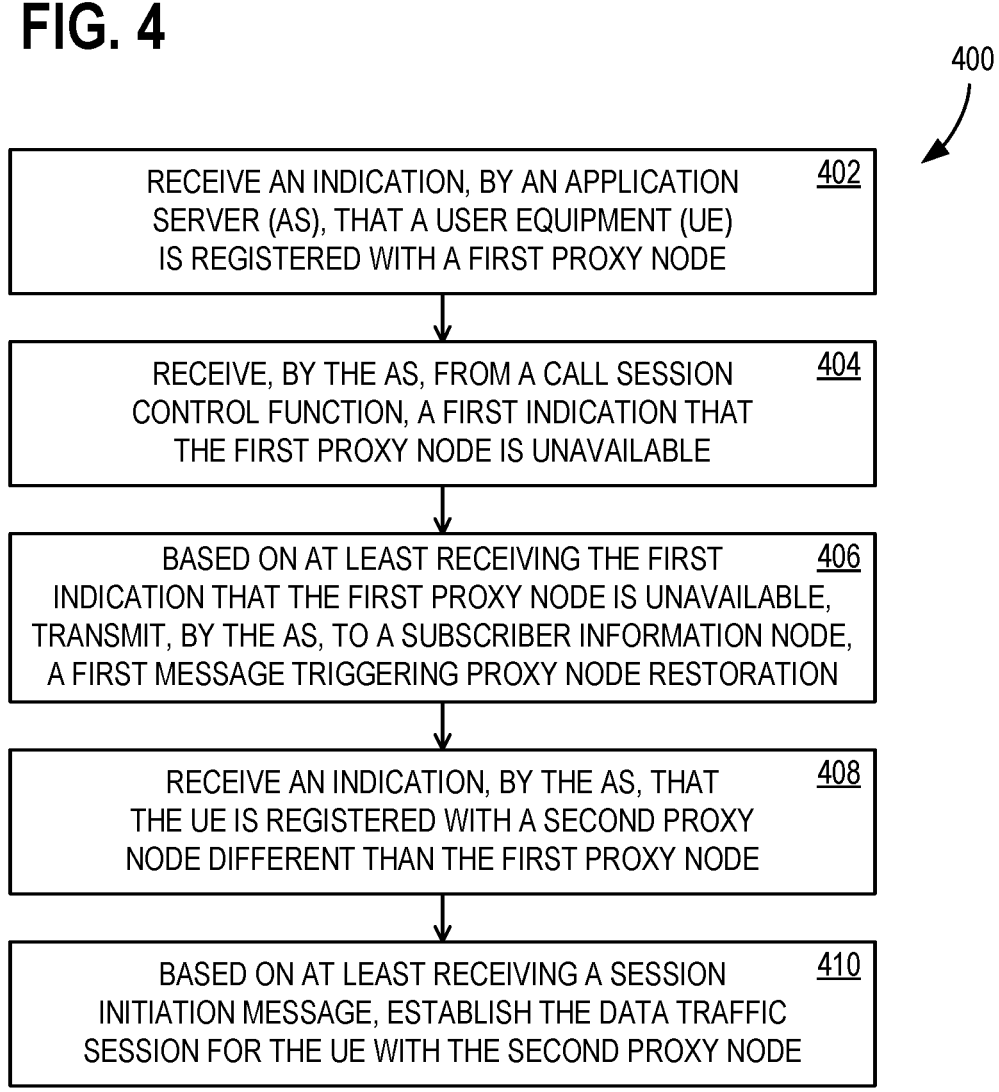
FIG. 4 illustrates another flowchart of exemplary operations associated with examples of the arrangement of FIG. 1.

Operation of arrangement 100 is further described in relation to FIGS. 2-4. FIG. 2 illustrates an exemplary message sequence diagram 200 associated with P-CSCF restoration by a 5G example version of arrangement 100. Each message indicated in message sequence diagram 200 may represent a single one-way message, a message and a response, or a plurality of messages. Proxy node 140a comes on-line and registers with status repository 130 using message 202a, and status repository 130 monitors the status of proxy node 140a using ongoing heartbeat messages 204a. When proxy node 140b comes on-line, it similarly registers with status repository 130 using message 202b, and is monitored by status repository 130 using ongoing heartbeat messages 204b.

UE 102 registers with network 110 using message 206, shown going to session management node 124 (which is an SMF in 5G). UE 102 performs a proxy node discovery with status repository 130 using message 208. Upon discovering that proxy node 140a is in a registered status, UE 102 registers with proxy node 140a using message 210. UE 102 continues re-registering with proxy node 140a, for example hourly, according to when each registration event is scheduled to expire. AS 160 (representing TAS 162 and/or IMP 164) is notified that proxy node 140a is acting as a proxy for UE 102 using message 212. At failure event 250, proxy node 140a becomes non-responsive and ceases to send heartbeat messages 202a to status repository 130. Timer 134 lapses without status repository 130 receiving a heartbeat message 202a from proxy node 140a. In some examples, status repository 130 changes the status of proxy node 140a on list 132 to suspended.

AS 160 receives a session initiation message 214a (e.g., a SIP invite) from IMS-AGW 128 (or another network node), for example an incoming call notification. AS 160 forwards the session initiation message as session initiation message 214b to CSCF 143, which forwards it to proxy node 140a as session initiation message 214c. Because proxy node 140a is not operating properly, proxy node 140a either responds to CSCF 143 with an error message 216 or times out. CSCF 143 transmits message 218 to AS 160, indicating to AS 160 that proxy node 140a is unavailable (e.g., that proxy node 140a timed out).

AS 160 transmits message 220 to subscriber information node 150 (shown as including both an HSS and a UDM), triggering proxy node restoration. In some examples, message 220 comprises a P-CSCF restoration indication. In some examples, message 220 uses an N71 interface. At some point, AS 160 responds to session initiation message 214a with a response message 232, although in some examples, message 232 may be delayed until UE 102 is registered with another proxy node and network 110 is able to set up data traffic session 106.

HSS 152 transmits message 222a to session management node 124 (and receives a response) further triggering proxy node restoration. When session management node 124 receives message 222a triggering proxy node restoration, multiple options 222b are available in 5G. These are described below in relation to box 328 and operation 330 of FIG. 3. In some examples, session management node 124 instructs UE 102 to release the PDN connection through proxy node 140a, using a PDN connection release message 224. This triggers UE 102 to release that connection and perform another proxy node discovery with status repository 130 using message 226. Upon discovering that proxy node 140b is in a registered status, UE 102 registers with proxy node 140b using message 228. UE 102 continues re-registering with proxy node 140b, for example hourly, according to when each registration event is scheduled to expire. AS 160 is notified that proxy node 140b is acting as a proxy for UE 102 using message 230. Network 110 is able to establish data traffic session 106 for UE 102 with proxy node 140b.

FIG. 3 illustrates a flowchart 300 of exemplary operations associated with message sequence diagram 200, using examples of arrangement 100 to provide for P-CSCF restoration. In some examples, at least a portion of flowchart 300 may be performed using one or more computing devices 500 of FIG. 5. Proxy nodes 140a and 140b register with status repository 130 in operation 302. That is, operation 302 includes registering, by proxy node 140a, with status repository 130, and registering, by proxy node 140b, with status repository 130. In some examples, proxy node 140a comprises a P-CSCF and proxy node 140b, comprises a P-CSCF. In some examples, status repository 130 comprises an NRF.

Status repository 130 monitors heartbeat messages in operation 304, which includes monitoring, by status repository 130, the heartbeat message from proxy node 140a and monitoring, by status repository 130, the heartbeat message from proxy node 140b. UE 102 registers with network 110 in operation 306. Operation 308 includes performing, by UE 102, a proxy node discovery with status repository 130. Operation 310 includes registering, by UE 102, with proxy node 140a. Operation 312 includes receiving an indication, by AS 160, that UE 102 is registered with proxy node 140a. In some examples, AS 160 comprises a TAS, and in some examples, AS 160 comprises an IMP or another server type.

UE 102 begins periodic re-registration with the serving proxy node 140a in operation 314. For example, during a first pass through flowchart 300, operation 314 includes repeatedly, based on at least a timer, re-registering, by UE 102, with proxy node 140a. When flowchart 300 later returns to operation 314, operation 314 includes repeatedly, based on at least a timer, re-registering, by UE 102, with proxy node 140b (which will be the serving proxy node at that time).

Operation 316 includes receiving, by AS 160, a session initiation message (e.g., message 218). In some examples, the session initiation message comprises a SIP message (e.g., a SIP invite). In some examples, the session initiation message comprises a message session relay protocol (MSRP) message. Operation 318 includes, based on at least receiving the first session initiation message, forwarding, by AS 160, to CSCF 143 (e.g., S-CSCF 142 or I-CSCF 144), the session initiation message. Also, in operation 318, CSCF 143 forwards the session initiation message to proxy node 140a. However, because proxy node 140a is unavailable, proxy node 140a either returns an error message or fails to respond, so that CSCF 143 times-out.

CSCF 143 determines that proxy node 140a is unavailable in operation 320. Operation 320 includes receiving, by CSCF 143, an indication that proxy node 140a is unavailable. In some examples, the indication that proxy node 140a is unavailable comprises a time-out without a response from proxy node 140a. In some examples, the indication that proxy node 140a is unavailable comprises message 216 from proxy node 140a. Operation 320 also includes, based on at least receiving the indication that proxy node 140a is unavailable, transmitting, by CSCF 143, to AS 160, an indication (e.g., message 218) that proxy node 140a is unavailable. Operation 320 further includes receiving, by AS 160, from CSCF 143, the indication that proxy node 140a is unavailable.

AS 160 triggers proxy node restoration in operation 322. Operation 322 includes, based on at least receiving the indication that proxy node 140a is unavailable, transmitting, by AS 160, to subscriber information node 150, a first message triggering proxy node restoration (e.g., message 220). In some examples, the first message triggering proxy node restoration is transmitted over an N71 interface. In some examples, the first message triggering proxy node restoration comprises a P-CSCF restoration indication. Operation 320 also includes receiving, at subscriber information node 150, from CSCF 143, the first message triggering proxy node restoration. In some examples, the first message triggering proxy node restoration is received over an N70 interface. In some examples, subscriber information node 150 comprises an HSS and/or a UDM.

Operation 324 includes, based on at least receiving the first message triggering proxy node restoration, transmitting, by subscriber information node 150, to management node 120, a second message (e.g., message 222a) triggering proxy node restoration. In some examples, management node 120 comprises an SMF. In some examples, management node 120 comprises an MME. In some examples, the second message triggering proxy node restoration comprises a P-CSCF restoration indication.

In 5G, management node 120 (e.g., the SMF) selects an optional restoration action in decision operation 326. The options are indicated in cellular standards 3GPP TS 23.380 and ETSI TS 123 380, for example in section 5.8.2 Common Procedures for P-CSCF Restoration in SGC. Two of the options are indicated in box 328, and are specified in section 5.8.2.2 P-CSCF Address List Update Procedure and section 5.8.2.3 DHCP based P-CSCF Selection Triggering Procedure. The third option, in section 5.8.2.4 PDU Session Release with Reactivation Procedure, is performed in operation 330. Operation 330 includes, based on at least receiving the second message triggering proxy node restoration, transmitting, by management node 120, to UE 102, an instruction to release a PDN connection (e.g., releasing UE 102 from using proxy node 140a). In some examples, the instruction to release the PDN connection comprises an IMS PDN connection release message.

Operation 332 includes, based on at least receiving the instruction to release the PDN connection, releasing, by UE 102, a connection to proxy node 140a. Operation 334 includes performing, by UE 102, a proxy node discovery with status repository 130, and operation 336 includes registering, by UE 102, with proxy node 140b. In operation 338, AS 160 receives an indication that UE 102 is registered with proxy node 140b (a different proxy node than proxy node 140a). Operation 340 includes, based on at least receiving a session initiation message (e.g., message 218 or another similar message) establishing data traffic session 106 for UE 102 with proxy node 140b. Response message 232 (responding to message 214a) may be a part of operation 340 or may have occurred earlier. Flowchart 300 then returns to operation 314, although with UE 102 now performing on-going re-registration with proxy node 140b.

FIG. 4 illustrates a flowchart 400 of exemplary operations associated with examples of arrangement 100. In some examples, at least a portion of flowchart 400 may each be performed using one or more computing devices 500 of FIG. 5. Operation 402 includes receiving an indication, by an AS, that a UE is registered with a first proxy node. Operation 404 includes receiving, by the AS, from a call session control function, a first indication that the first proxy node is unavailable.

Operation 406 includes, based on at least receiving the first indication that the first proxy node is unavailable, transmitting, by the AS, to a subscriber information node, a first message triggering proxy node restoration. Operation 408 includes receiving an indication, by the AS, that the UE is registered with a second proxy node different than the first proxy node. Operation 410 includes, based on at least receiving a session initiation message, establishing the data traffic session for the UE with the second proxy node.

Figure 5:
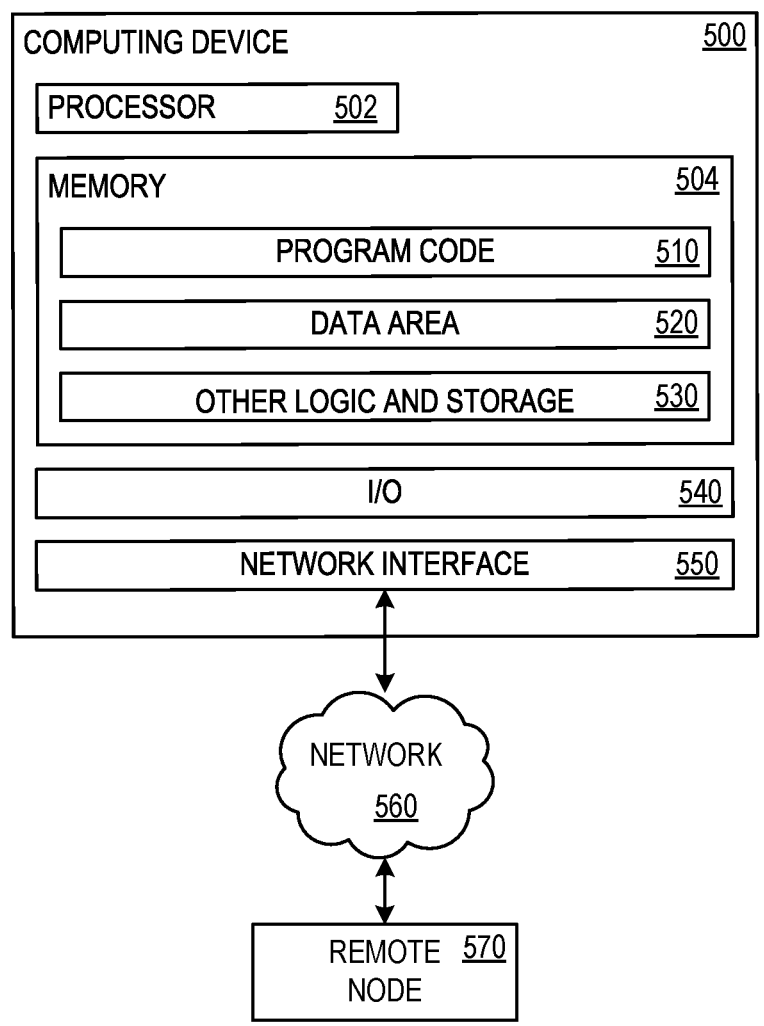
FIG. 5 illustrates a block diagram of a computing device suitable for implementing various aspects of the disclosure.

FIG. 5 illustrates a block diagram of computing device 500 that may be used as a component of arrangement 100, for example, as any component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500.

Additional Examples

An example method of providing a data traffic session comprises: receiving an indication, by an AS, that a UE is registered with a first proxy node; receiving, by the AS, from a call session control function, a first indication that the first proxy node is unavailable; based on at least receiving the first indication that the first proxy node is unavailable, transmitting, by the AS, to a subscriber information node, a first message triggering proxy node restoration; receiving an indication, by the AS, that the UE is registered with a second proxy node different than the first proxy node; and based on at least receiving a session initiation message, establishing the data traffic session for the UE with the second proxy node.

An example system for providing a data traffic session comprises: a processor; and a computer-readable medium storing instructions that are operative upon execution by the processor to: receive an indication, by an AS, that a UE is registered with a first proxy node; receive, by the AS, from a call session control function, a first indication that the first proxy node is unavailable; based on at least receiving the first indication that the first proxy node is unavailable, transmit, by the AS, to a subscriber information node, a first message triggering proxy node restoration; receive an indication, by the AS, that the UE is registered with a second proxy node different than the first proxy node; and based on at least receiving a session initiation message, establish the data traffic session for the UE with the second proxy node.

One or more example computer storage devices has computer-executable instructions stored thereon, which, upon execution by a computer, cause the computer to perform operations comprising: receiving an indication, by an AS, that a UE is registered with a first proxy node; receiving, by the AS, from a call session control function, a first indication that the first proxy node is unavailable; based on at least receiving the first indication that the first proxy node is unavailable, transmitting, by the AS, to a subscriber information node, a first message triggering proxy node restoration; receiving an indication, by the AS, that the UE is registered with a second proxy node different than the first proxy node; and based on at least receiving a session initiation message, establishing a data traffic session for the UE with the second proxy node.

Alternatively, or in addition to the other examples described herein, examples include any combination of the following:

the first message triggering proxy node restoration is transmitted over an N71 interface;

the AS comprises a TAS;

based on at least receiving the first message triggering proxy node restoration, transmitting, by the subscriber information node, to a management node, a second message triggering proxy node restoration;

receiving, by the call session control function, a second indication that the first proxy node is unavailable, the second indication that the first proxy node is unavailable comprises a time-out without a response from the first proxy node;

the second indication that the first proxy node is unavailable comprises a message from the first proxy node;

based on at least receiving the second indication that the first proxy node is unavailable, transmitting, by the call session control function, to the AS, the first indication that the first proxy node is unavailable;

based on at least receiving the second message triggering proxy node restoration, transmitting, by the management node, to the UE, an instruction to release a PDN connection;

based on at least receiving the instruction to release the PDN connection: releasing, by the UE, a connection to the first proxy node; performing, by the UE, a proxy node discovery with a status repository; and registering, by the UE, with the second proxy node;

the first proxy node comprises a P-CSCF;

the second proxy node comprises a P-CSCF;

the call session control function comprises an S-CSCF;

the subscriber information node comprises an HSS;

the subscriber information node comprises a UDM;

the management node comprises an SMF;

the management node comprises an MME;

the first message triggering proxy node restoration comprises a P-CSCF restoration indication;

the second message triggering proxy node restoration comprises a P-CSCF restoration indication;

the session initiation message comprises a SIP message;

the status repository comprises an NRF;

receiving, by the AS, the session initiation message;

responding, by the AS, to the session initiation message; and based on at least receiving the first session initiation message, forwarding, by the AS, to the call session control function, the session initiation message.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of providing a data traffic session, the method comprising:
receiving an indication, by an application server (AS), that a user equipment (UE) is registered with a first proxy node;
receiving, by the AS, from a call session control function, a first indication that the first proxy node is unavailable;
based on at least receiving the first indication that the first proxy node is unavailable, transmitting, by the AS, to a subscriber information node, a first message triggering proxy node restoration;
based at least on receiving an instruction to release a packet data network (PDN) connection, receiving, by the AS, an indication of the UE performing a proxy node discovery with a status repository, the status repository having a heartbeat timer associated with the first proxy, the heartbeat timer being reset each time a heartbeat message is received from the first proxy node, the heartbeat timer lapsing when no heartbeat messages are received from the first proxy during a period of the heartbeat timer;
receiving an indication, by the AS prior to the heartbeat timer lapsing, that the UE is registered with a second proxy node different than the first proxy node; and
based on at least receiving a session initiation message, establishing the data traffic session for the UE with the second proxy node.

2. The method of claim 1, wherein the first message triggering proxy node restoration is transmitted over an N71 interface.

3. The method of claim 1, wherein the AS comprises a telephony application server (TAS).

4. The method of claim 1, further comprising:
based on at least receiving the first message triggering proxy node restoration, transmitting, by the subscriber information node, to a management node, a second message triggering proxy node restoration.

5. The method of claim 4, further comprising:
based on at least receiving the second message triggering proxy node restoration, transmitting, by the management node, to the UE, the instruction to release the PDN connection; and
based on at least receiving the instruction to release the PDN connection:
releasing, by the UE, a connection to the first proxy node;
performing, by the UE, the proxy node discovery with the status repository; and
registering, by the UE, with the second proxy node.

6. The method of claim 5:
wherein the first proxy node and the second proxy node each comprises a proxy-call session control function (P-CSCF);
wherein the call session control function comprises a serving-call session control function (S-CSCF);
wherein the subscriber information node comprises a home subscriber server (HSS) and/or a unified data management function (UDM);
wherein the management node comprises a session management function (SMF) or a mobility management entity (MME);
wherein at least one of the first message triggering proxy node restoration or the second message triggering proxy node restoration comprises a P-CSCF restoration indication;
wherein the session initiation message comprises a session initiation protocol (SIP) message; and
wherein the status repository comprises a network repository function (NRF).

7. The method of claim 1, further comprising:
receiving, by the call session control function, a second indication that the first proxy node is unavailable, wherein the second indication that the first proxy node is unavailable comprises a time-out without a response from the first proxy node, or wherein the second indication that the first proxy node is unavailable comprises a message from the first proxy node; and
based on at least receiving the second indication that the first proxy node is unavailable, transmitting, by the call session control function, to the AS, the first indication that the first proxy node is unavailable; and
suspending the first proxy node.

8. A system for providing a data traffic session, the system comprising:
a processor; and
a computer-readable medium storing instructions that are operative upon execution by the processor to:
receive an indication, by an application server (AS), that a user equipment (UE) is registered with a first proxy node;
receive, by the AS, from a call session control function, a first indication that the first proxy node is unavailable;
based on at least receiving the first indication that the first proxy node is unavailable, transmit, by the AS, to a subscriber information node, a first message triggering proxy node restoration;
based at least on receiving an instruction to release a packet data network (PDN) connection, receive, by the AS, an indication of the UE performing a proxy node discovery with a status repository, the status repository having a heartbeat timer associated with the first proxy, the heartbeat timer being reset each time a heartbeat message is received from the first proxy node, the heartbeat timer lapsing when no heartbeat messages are received from the first proxy during a period of the heartbeat timer;
receive an indication, by the AS prior to the heartbeat timer lapsing, that the UE is registered with a second proxy node different than the first proxy node; and
based on at least receiving a session initiation message, establish the data traffic session for the UE with the second proxy node.

9. The system of claim 8, wherein the first message triggering proxy node restoration is transmitted over an N71 interface.

10. The system of claim 8, wherein the AS comprises a telephony application server (TAS).

11. The system of claim 8, wherein the instructions further cause the processor to:
based on at least receiving the first message triggering proxy node restoration, transmitting, by the subscriber information node, to a management node, a second message triggering proxy node restoration.

12. The system of claim 11, wherein the instructions further cause the processor to:

based on at least receiving the second message triggering proxy node restoration, transmit, by the management node, to the UE, the instruction to release the PDN connection; and based on at least receiving the instruction to release the PDN connection:
release, by the UE, a connection to the first proxy node;
perform, by the UE, the proxy node discovery with the status repository; and
register, by the UE, with the second proxy node.

13. The system of claim 12:
wherein the first proxy node and the second proxy node each comprises a proxy-call session control function (P-CSCF);
wherein the call session control function comprises a serving-call session control function (S-CSCF);
wherein the subscriber information node comprises a home subscriber server (HSS) and/or a unified data management function (UDM);
wherein the management node comprises a session management function (SMF) or a mobility management entity' (MME);
wherein at least one of the first message triggering proxy node restoration or the second message triggering proxy node restoration comprises a P-CSCF restoration indication;
wherein the session initiation message comprises a session initiation protocol (SIP) message; and
wherein the status repository comprises a network repository' function (NRF).

14. The system of claim 8, wherein the instructions further cause the processor to:
receiving, by the call session control function, a second indication that the first proxy node is unavailable, wherein the second indication that the first proxy node is unavailable comprises a time-out without a response from the first proxy node, or w herein the second indication that the first proxy node is unavailable comprises a message from the first proxy node; and
based on at least receiving the second indication that the first proxy node is unavailable, transmitting, by the call session control function, to the AS, the first indication that the first proxy node is unavailable.

15. One or more computer storage devices having computer-executable instructions stored thereon, which, upon execution by a computer, cause the computer to perform operations comprising:
receiving an indication, by an application server (AS), that a user equipment (UE) is registered with a first proxy node;
receiving, by the AS, from a call session control function, a first indication that the first proxy node is unavailable;
based on at least receiving the first indication that the first proxy node is unavailable, transmitting, by the AS, to a subscriber information node, a first message triggering proxy node restoration;

based at least on receiving an instruction to release a packet data network (PDN) connection, receiving, by the AS, an indication of the UE performing a proxy node discovery with a status repository, the status repository having a heartbeat timer associated with the first proxy, the heartbeat timer being reset each time a heartbeat message is received from the first proxy node, the heartbeat timer lapsing when no heartbeat messages are received from the first proxy during a period of the heartbeat timer;
receiving an indication, by the AS prior to the heartbeat timer lapsing, that the UE is registered with a second proxy node different than the first proxy node; and
based on at least receiving a session initiation message, establishing a data traffic session for the UE with the second proxy node.

16. The one or more computer storage devices of claim 15, wherein the first message triggering proxy node restoration is transmitted over an N71 interface.

17. The one or more computer storage devices of claim 15, wherein the AS comprises a telephony application server (TAS).

18. The one or more computer storage devices of claim 15, wherein the operations further comprise:
based on at least receiving the first message triggering proxy node restoration, transmitting, by the subscriber information node, to a management node, a second message triggering proxy node restoration.

19. The one or more computer storage devices of claim 18, wherein the operations further comprise:
based on at least receiving the second message triggering proxy node restoration, transmitting, by the management node, to the UE, the instruction to release the PDN connection; and
based on at least receiving the instruction to release the PDN connection:
releasing, by the UE, a connection to the first proxy node;
performing, by the UE, the proxy node discovery with the status repository; and
registering, by the UE, with the second proxy node.

20. The one or more computer storage devices of claim 15, wherein the operations further comprise:
receiving, by the call session control function, a second indication that the first proxy node is unavailable, wherein the second indication that the first proxy node is unavailable comprises a time-out without a response from the first proxy node, or wherein the second indication that the first proxy node is unavailable comprises a message from the first proxy node; and
based on at least receiving the second indication that the first proxy node is unavailable, transmitting, by the call session control function, to the AS, the first indication that the first proxy node is unavailable.

* * * * *